US008544913B2

(12) United States Patent
Janocha

(10) Patent No.: US 8,544,913 B2
(45) Date of Patent: Oct. 1, 2013

(54) GRILL TONGS HAVING A HEAT SHIELD

(75) Inventor: Daniel Janocha, Wurzburg (DE)

(73) Assignee: Daniel Janocha, Wurzburg (DE)

( * ) Notice: Subject to any disclaimer, the term of this patent is extended or adjusted under 35 U.S.C. 154(b) by 0 days.

(21) Appl. No.: 13/382,406

(22) PCT Filed: Jun. 12, 2010

(86) PCT No.: PCT/DE2010/000665
§ 371 (c)(1),
(2), (4) Date: Mar. 22, 2012

(87) PCT Pub. No.: WO2011/003377
PCT Pub. Date: Jan. 13, 2011

(65) Prior Publication Data
US 2012/0169080 A1 Jul. 5, 2012

(30) Foreign Application Priority Data
Jul. 10, 2009 (DE) .......................... 10 2009 032 554

(51) Int. Cl.
*B25B 7/00* (2006.01)
*B25B 9/00* (2006.01)
(52) U.S. Cl.
USPC ........................................ 294/99.2; 294/131
(58) Field of Classification Search
USPC ................ 294/99.2, 131, 9–11; 30/323, 326; 16/431
See application file for complete search history.

(56) References Cited

U.S. PATENT DOCUMENTS

| 3,858,320 | A | * | 1/1975 | Neal et al. ........................ 30/323 |
| 4,103,420 | A | * | 8/1978 | Davis ............................... 30/129 |
| 4,261,608 | A | * | 4/1981 | Bradshaw ........................ 294/25 |
| 4,768,288 | A |   | 9/1988 | Culbertson ..................... 30/142 |
| 5,206,998 | A | * | 5/1993 | Oriente et al. .................. 30/142 |
| D350,050 | S | * | 8/1994 | Klunder ......................... D7/686 |
| 2007/0187963 | A1 | * | 8/2007 | Repp et al. ........................ 294/3 |

FOREIGN PATENT DOCUMENTS

| DE | 198 19 084 A1 | 10/1998 |
| DE | 20 2008 01416 U1 | 2/2009 |

OTHER PUBLICATIONS

International Preliminary Report on Patentability for PCT Application No. PCT/DE2010/000665, dated Jan. 19, 2012, 6 pages.
International Search Report (with English translation) for PCT Application No. PCT/DE2010/000665, dated Sep. 6, 2010, 4 pgs.

* cited by examiner

*Primary Examiner* — Stephen Vu
(74) *Attorney, Agent, or Firm* — Westman, Champlin & Kelly, P.A.

(57) ABSTRACT

Grill tongs including two rods, which are movably connected and which can be pivoted relative to each other and which each have a gripping surface for an item to be grilled at the end of the rods near the grill and which are equipped with a handle at the end of the rods far from the grill. The handle is used as a contact surface for the fingers of a user. A heat shield is arranged on the rod in the area of the handle. The heat shield is fastened to the side of the rod inside the tongs and from there curves around the side of the handle facing outward and is at a distance to the handle.

16 Claims, 2 Drawing Sheets

GRILL TONGS HAVING A HEAT SHIELD

CROSS-REFERENCE TO RELATED APPLICATION

This Application is a Section 371 National Stage Application of International Application No. PCT/DE2010/000665, filed Jun. 12, 2010 and published as WO 2011/003377 on Jan. 13, 2011, in German, the contents of which are hereby incorporated by reference in their entirety.

BACKGROUND

The invention relates to grill tongs, comprising two rods, which are movably connected and which can be pivoted relative to each other and which each have a gripping surface for an item to be grilled at the end of the rods near the grill and which are equipped with a handle at the end of the rods far from the grill, which handle is used as a contact surface for the fingers of a user.

For cooking sausages, meat, so-called kebabs, that is to say pieces of meat ranged on an elongated skewer, or other foods, a well-known and widespread technique is to lay them on a grill, which is disposed at a very short distance above a heat source, such as a charcoal fire. The heat radiated by the charcoal fire and, to a lesser extent, air heated by this fire, heats the item to be grilled to its interior and produces a crust on the outside, which is regarded as tasty complement to the through-cooked inner region of the item to be grilled.

The temperature resulting from the heat source must be high enough for the cooking process to take place within the item to be grilled. This temperature is so high that it would burn the hands of a user who touched the item to be grilled directly. It is therefore necessary to use a tool for placing, turning and removing the item being grilled. For this object, inter alia, tongs or scissor-like tools are widely used. They consist of two rods at the ends of which facing the grill, two gripping surfaces are arranged, with which the item being grilled is contacted and picked up. At both other ends of the rods, handles are disposed or integrally form, with which the user picks up and moves the grill tongs. Due to the length of the rods, it is achieved that the user's hand assumes a distance from the heat source. The radiation intensity of the heat source decreases with increasing distance. However, a restriction is that such an intense heat is radiated over the entire surface of the grill that meat can be cooked at all points. That also leads to the fact that despite the great distance of the users' hand from the surface of the grill at all points of the grill, injuries are nevertheless possible if the distance of the users' hand from the grill surface is still relatively low.

In the prior art, German patent DE 196 22 352, Steubing, describes grill tongs that comprise two L-shaped elements that are connected via two articulation points to form an L-shaped tongs unit. Though it is thereby achieved that the user's hand is no longer in the radiant range of the grill, but the resulting construction is relatively large and cumbersome, as a result of which the user always has to manage a very large mass compared to the item being grilled. This not only impairs the subjectively perceived comfort, but, as a result, the positioning accuracy achieved with the unit is unnecessarily restricted, which, ultimately, can result in a non-uniformly cooked grilled item.

To avoid the disadvantage of the excessively long rods of this grill tongs, other solutions are known, which only propose very short rods, with which it is possible to achieve satisfactory handling of the item being grilled. However, because the user's hand can come into the radiant range of the grill, the utility model DE 20 2005 014 573, Schluch, proposes that the handles of the grill tongs are covered by a heat-protection shield. This heat protection shield is intended both for the new equipping as well for retrofitting of already-used grill tongs. It consists of a box-like enclosure of the user's hand with a slit for pushing through the tongs. However, the user must resolve for himself how to connect this plate to the tongs such that in the most unfavourable case he not only has to pay attention to the movement of the item being grilled but also to the fact that that the heat shield doesn't shift or even fall down.

SUMMARY

Against this background, it is the object of the invention to develop a heat protection shield for grill tongs that can be disposed simply and inexpensively on grill tongs and can protect at least the major portion of the user's hand against radiant heat, but restricts him as little as possible during picking up and using the tongs, and guides his hand into a thermally appropriate position.

As a solution, the invention proposes that a heat shield is disposed on the rod in the region of the handle, which is fixed on that side of the rod that is at the interior of the tongs, and from there curves around the outwardly facing side of the handle and is thereby at a distance from the handle.

The main feature of the invention is that a heat protection shield is fastened on only a single one of the two rods, which corresponds to the fact that the major portion of the hand of a user, namely the four fingers from the index finger to the little finger jointly enclose a handle, and it is appropriate to protect primarily this larger portion of the hand. The opposite side of the grill tongs at the other rod, is "only" gripped by the thumb.

In general, however, it is not directly exposed to the radiation of the grill, specifically if the grill tongs are used such that the pivot axis extends between the two rods approximately parallel to the surface of the grill. Then, one gripping surface grips the item to be grilled from its underside by pushing itself like a wedge between the grill and the item to be grilled. The other gripping surface is then located above this first gripping surface. The thumb that is not protected by an additional heat shield is then located above "its" handle and also above the lower handle and the single heat shield. Since these elements already by their nature ward off radiant and convection heat, the upwardly pointing thumb is already protected. In addition, it also enjoys thermal protect by the single heat shield, which is considerably wider than the handles.

The four fingers that lie on the downwardly pointing side of the grill tongs are protected from the radiant heat of the grill by the heat shield.

The distance between the heat shield and the handle surface is appropriately so large that not only the fingers of a somewhat larger hand can fit therein, but also that they are additionally spaced from these fingers. By this means the accommodation of the tongs is facilitated, and thereby an air layer forms between the heat shield and the fingers during use, which serves as additional insulation layer.

However, if the grill tongs are exceptionally used such that their pivot axis is oriented approximately perpendicular to the grill surface, the four fingers of the hand are still protected by the heat shield. The thumb of the user's hand, which lies on the other handle, is itself then additionally at least partly protected from radiant heat at least by the handle; only the fingertip is then exposed to radiant heat.

By experience, this heating of a smaller part of the hand surface can be compensated by an intensified blood flow of the heated region, since the heated blood volume is immediately cooled in the adjacent cooler regions.

However, this slight restriction, deliberately chosen by the invention, considerably simplifies the operation and production of grill tongs according to the invention: The relatively large opening between the heat shield and the handle which it surrounds intuitively requires the four fingers to be inserted, since it corresponds to the size thereof. That also corresponds to the human reflex to immediately protect the major portion of the hand surface. A further advantage is that the placing of the thumb is then subjectively no longer affected by a heat shield, but lies completely in the visible area.

A further advantage is that, for using the grill tongs on the extended arm and with the orientation of the grill tongs approximately in the extension of arm, the view of the item to be grilled, which is to be handled, directly past the upper handle with the thumb resting thereon, is not restricted by a heat shield, which considerably assists the security of handling.

It is advantageous in contrast to the prior art that only a single heat shield is required, that is to say that the extra cost for the heat shield is halved.

Since the four fingers bent around the lower handle, from the index finger to the little finger, assume in first approximation a cylindrical form, it is appropriate that the heat shield, too, is designed as a hollow cylindrical segment. Its profile is appropriately approximately ¾ of a circle. The remaining "free" portion of the circle forms the opening, through which the fingers are pushed into the protective region of the heat shield.

This profile should—as mentioned—have such a large distance from the handle that not only the fingers of the hand can be pushed therein, but an additional air space remains, which represents a further insulating layer.

To fix this profile, it is connected at one longitudinal edge to the inward facing side of the handle. There, a tangent to the profile runs approximately parallel to the pivot axis of the tongs.

Alternatively, however, the profile of the heat shield can also be executed as a spiral, its distance from the rod being smaller in the vicinity of the fixture of the heat shield than at that end of the heat shield that is remote from the fixture. As a result, the distance of the heat shield from the handle reduces continuously. Like a "rolled-up" funnel, it thus serves for ergonomically appropriate guidance of the fingers during insertion between the handle and heat shield.

Alternatively to a continually curved spiral, the profile of the heat shield can also be approximated by a polygon, as a result of which the production, in particular of relatively small quantities, is further simplified.

In any case, independently of the shape of the heat shield, it is a very fundamental advantage that the user's hand does not need to be shielded against the heat of the grill by additional insulation—for example a grill glove—but inevitably, with the putting on of the grill tongs, the hand is simultaneously also protected against radiant and convection heat from the grill.

Since the mass of the heat shield makes up a considerable proportion of the total weight of the grill tongs, the centre of gravity of the entire grill tongs is thus located within the heat shield. An effective variant is therefore that at least one plane is formed into the heat shield that can be used for laying down the entire tongs. This plane results from a polygonal form of the heat shield without further outlay. Only with uniformly curved heat shields is it necessary to form in a plane or to attach it as an additional part with a single standing surface of with a plurality of relatively small standing surfaces.

In the simplest case, a hollow cylindrical segment as heat shield is a correspondingly curved or folded metal sheet. In addition, it can be closed by a wall oriented transversely to its longitudinal axis. In particular the side facing the handle surfaces and therefore the heat of the grill should appropriately be sealed, since the thermal protection is thereby improved. Such a "transverse wall" also serves for additional stiffening of the heat shield.

In principal, it is possible to mount such a transverse wall also at the other side, facing away from grill. In a very simple embodiment, however, it is also non-essential because the air exchange thereby takes place within the heat shield, and thereby additional cooling of the fingers located therein is improved.

Grill tongs according to the invention can be embodied in two principally different variants: In one case—as known, for example, from tweezers—with the pivot axis at that end of the two rods remote from the grill. Alternatively to this—in a similar way to, for example, paper scissors—with a pivot axis that is disposed between the handles and the gripping surfaces of the grill tongs.

Because the grill tongs, in a similar way to tweezers, it is a similar variant that the functions of the pivot axis and of the spring element are executed by an approximately U-shaped, permanently elastic metal strip, at the two ends of which one rod in each case is fixed. This metal strip must be permanently elastic, that is to say, for example, must consist of resilient sheet metal or a corresponding plastic. An appropriate alternative embodiment is, for example, a sheet metal strip, riveted or screwed onto the wooden rods. The wooden rods can then be provided with an integrally moulded handle region.

Another embodiment consists of a metal strip, at the two ends of which one gripping surface in each case is integrally moulded and which is bent to a U-shape in the centre. To delimit the resilient region in the centre from the, as far as possible, inelastic elongated regions between the pivot axis and the gripping surfaces, it is appropriate that these regions are profiled in their longitudinal direction, that is to say, for example, strips following the edges are folded over. Due to this U-shaped profile, the rods are considerably stiffer than the short region in the centre, which is formed into a U-shape, and, by elastic resilience, serves as a pivot axis.

In the aforementioned other alternative, the pivot axis is disposed between the gripping surfaces and the handles. An advantage of this arrangement is that it is then possible to dispense with the spring force, which forces the two rods apart when it is not in use. In this case, the force for "opening" the scissors must be applied by tensile forces to the two handles. To this end, both handles—as is known from scissors—must be provided with an opening in each case. The thumb engages in one opening and the other four fingers of the users hand engage in the other opening. As a result, the opening for the thumb in the longitudinal direction of the rods is smaller than the opening for the four fingers. The opening for the four fingers should be at least twice as long as the other opening for the thumb.

In both embodiments, the fastening of the heat shield indicates whether the grill tongs can be used with the right hand or with the left. To allow both left-handed and right-handed persons to use the grill tongs, it appropriate that the heat shield can be released by the user with simple means and fastened again on the other side. That can be achieved, for example by means of a screw connection. However, if the grill tongs are to be very quickly changes from right-handed to left-handed, plug or detent connections shall be preferred.

Irrespective of that, it is appropriate that the handle is thermally insulated from the rod and from the heat shield. At least one screw and/or a dowel and/or a rivet and/or an integrally formed pin with a transverse bore and a wedge and/or an adhesive layer and/or a folded sheet metal lug can be connected to at least one of the two elements.

In a further alternative embodiment, the gripping surfaces are in each case formed as an elongated element, the longitudinal axes of which extend opposite the longitudinal axis of the respective rods at an angle, and the free ends thereof point in the same direction with respect to the rods as the closed side of the heat shield. If the grill tongs are used such that their pivot axis is oriented perpendicular to the surface of the grill, then the elongated and "angled" gripping surfaces point downwards onto the grill surface. Then it is advantageous that the rods, and therefore also the longitudinal axis of the heat shield runs approximately parallel to the surface of the grill, because, as a result, no radiant heat penetrates into the front, open end face of the heat shield and heats or overheats the index finger of the user's hand.

BRIEF DESCRIPTION OF THE DRAWINGS

Further details and features of the invention are described below with reference to an example. This is not intended to restrict the invention, but only to explain it. In schematic, view.

DETAILED DESCRIPTION OF ILLUSTRATIVE EMBODIMENTS

Figure 1:
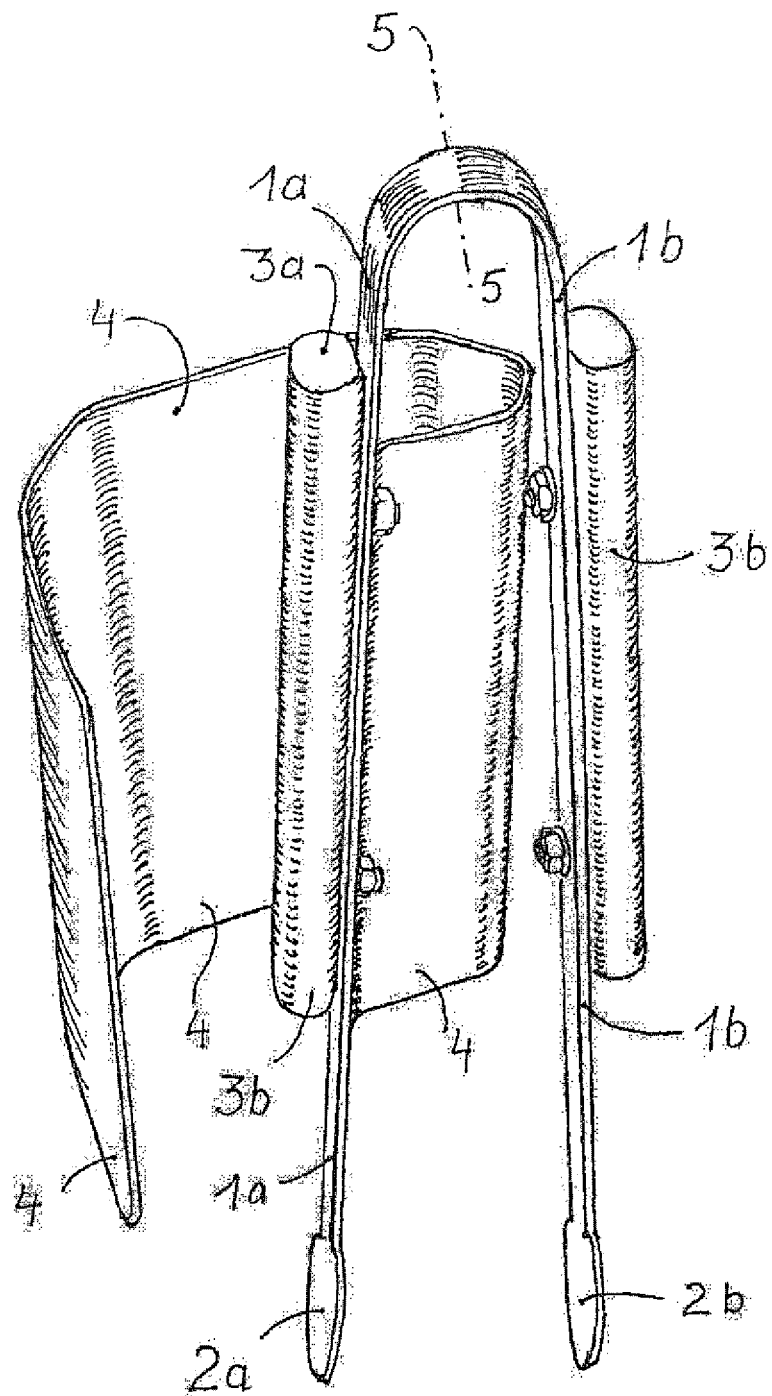
FIG. 1 shows grill tongs according to the invention with a heat shield on the first rod

FIG. 1 shows grill tongs according to the teaching of the invention in oblique view. It consists of the first rod 1a, at the left-hand side in this case, and of the second rod 1b, at the right-hand side in this case. At those ends of the two rods 1a, 1b facing the grill, one gripping surface 2a, 2b is integrally moulded, with which the item to be grilled is picked up. The two other ends of the rods 1a, 1b are in this exemplary embodiment connected by an integrally formed, U-shaped metal strip, which serves as pivot axis 5.

In FIG. 1, it can be readily seen how, on the two rods 1a, 1b, a handle 3a, 3b, in each case is fixed, in this case by means of two screws in each case.

On the left-hand handle 3a, the heat shield 4 is also mounted on the two screws and also fixed by means of the screw fastening. In FIG. 1, it can be readily seen how the heat shield 4 curves around the handle 3a. To this end, in the immediate vicinity of its fastening on the handle 3a, it is oriented perpendicular to the pivot axis 5, and after reaching a certain distance from the handle 3a, here curves in a polygonal angle approximately in the form of a spiral, the distance of which from the handle 3a becomes ever larger with increasing distance from the fastening point. The front-facing opening between the heat shield 4 and the handle 3a is therefore considerably wider than the distance between that part of the heat shield 4 to be seen at the right of the rod 1 and the first handle 3a.

In FIG. 1, it can be readily seen how, by pressure on the two handles 3a and 3b, the two rods 1a and 1b can be pivoted towards one another, and how, after removal of this force, automatically move away from one another due to the elasticity of the U-shaped curved metal strip in the region of the pivot axis 5.

Figure 2:
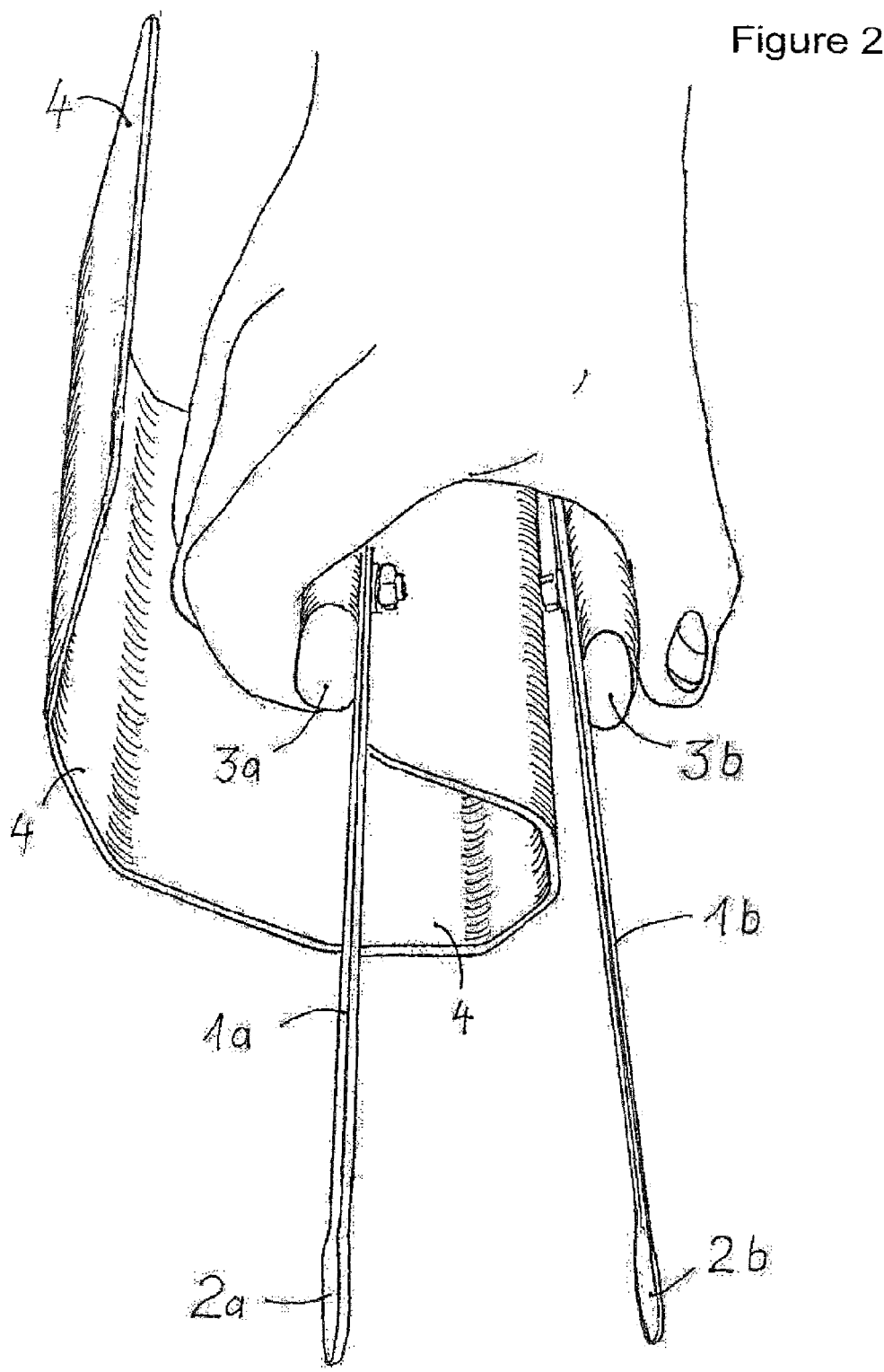
FIG. 2 shows grill tongs as in FIG. 1, but picked up by a user's hand

FIG. 2 shows the same grill tongs as in FIG. 1, but shown in a somewhat pivoted position in which—in contrast to FIG. 1—those end faces of the two handles 3a and 3b that are close to the grill are visible.

In FIG. 2, it is show how a user's hand picks up the grill tongs: It can be readily seen how the thumb lies on the second handle 3b, and how the index finger, middle finger and ring finger lie on the opposite handle 3a. The fifth finger of the hand, the little finger, is covered by the ring finger in this view, it is, however, plausible, that it must be disposed behind the ring finger.

In FIG. 2, it can be readily seen how the four fingers, from the index finger to the little finger, are introduced into the opening between the handle 3a and the heat shield 4, and are curved around the handle 3a. In FIG. 2, it can be clearly seen how, in this state, a distance results between the fingers and the heat shield 4, which keeps the fingers away from the heat shield 4, and allows the air to flow through the remaining interspace, so that the fingers can be cooled by an air current through the interior of the heat shield, which counteracts heating of the heat shield 4 through the external contact with the rising air.

In FIG. 2—and also in FIG. 1—the item to be grilled that is picked up between the two gripping surfaces 2a and 2b is not shown.

In FIG. 2 and FIG. 1, the grill is also not shown. In FIG. 2, however, it is understandable that it is most appropriate if the first gripping surface 2a grips the item to be grilled from its underside and the second gripping surface 2b contacts the item to be grilled from its upper side. Then the heat of the grill radiates first against the heat shield 4, in FIG. 2 that is to say from the left. Then, four fingers are protected by the heat shield 4 and also the thumb, since the heat shield 4 extends forwards and backwards beyond the plane of the drawing. In FIG. 2, it thus becomes clear how, in a very typical posture of the user's hand, a single heat shield 4 protects both rods 1a, 1b of the grill tongs according to the invention.

In FIG. 2, it is also understandable how, in a further appropriate user posture, the major portion of the hand is thermally protected by the heat shield 4: if the two gripping surfaces 2a and 2b grasp the item to be grilled from one side in each case, then the thermal radiation behind the plane of the drawing of FIG. 2 approaches the grill tongs. Then, it is readily understandable that all four fingers are very well protected behind the heat shield in this position, too. Due to the inward-facing "bulging" of the heat shield, the hand itself is also protected from radiant heat from below. The thumb, on the other hand, is protected by the "heat shadow" of the second handle 3b, and only the tip of the thumb is exposed, unprotected, to the thermal radiation.

In FIG. 2, however, it is very easily understandable that the surface of the thumb that is exposed to the radiation is considerably smaller than the surface of the hand that is thermally very well protected, so that only a relatively small amount of heat enters the hand via the thumb. This amount of heat can be very much better and more rapidly dissipated by the blood volume in the hand than in the case of complete heating of the entire hand, so that, when the item to be grilled is grasped, very good heat protection is also afforded by the heat shield 4.

LIST OF REFERENCE CHARACTERS

1a First rod
1b Second rod, movably connected to the first rod 1a
2a First gripping surface on the first rod 1a
2b Second gripping surface on the second rod 1b
3a First handle on the first rod 1a

3b Second handle on the second rod 1b
4 Heat shield on the first rod 1a
5 Pivot axis of the connection between the first rod 1a and the second rod 1b

The invention claimed is:

1. Grill tongs consisting of two rods
   which are movably connected and
   which can be pivoted relative to each other and
   which each have a gripping surface for an item to be grilled at a first end of the rods
   which are equipped with a handle at an opposed second end of the rods, which handle is used as a contact surface for the fingers of a user,
characterized in that a heat shield is disposed on the rod proximate of the handle,
   which is fastened on a side of the rod that is on an interior of the tongs and
   from there curves around an outwardly facing side of the handle and
   is thereby at a distance from the handle
   wherein the heat shield is a hollow segment, having a profile which is approximately ¾ of a circle and tangent at a point of fastening to the handle is approximately parallel to a pivot axis of the two rods.

2. Grill tongs according to claim 1, characterized in that a profile of the heat shield approximately corresponds to a spiral, a distance from a rod being smaller in a vicinity of a fastening of the heat shield than at that an end of the heat shield that is remote from the fastening.

3. Grill tongs according to claim 1, characterized in that a profile of the heat shield is approximated by a polygon.

4. Grill tongs according to claim 1, characterized in that a profile of the heat shield at that side facing the gripping surfaces is closed.

5. Grill tongs according to claim 1, wherein the heat shield includes a plane which can be used for laying down the tongs.

6. Grill tongs according to claim 1, characterized in that a pivot axis is disposed at an end of each rod, and wherein the pivot axis comprises a spring element configured to force the rods apart in the unloaded state.

7. Grill tongs according to claim 6, characterized in that the pivot axis comprises a U-shaped, permanently elastic metal strip, at the two second opposed ends of which a rod is fastened.

8. Grill tongs according to claim 7, characterized in that the metal strip and the rods are formed in one piece.

9. Grill tongs according to claim 1, characterized in that the rods are profiled in their longitudinal direction.

10. Grill tongs according to claim 1, characterized in that a pivot axis is disposed between the gripping surfaces and the handles.

11. Grill tongs according to claim 1, characterized in that the handles have an opening.

12. Grill tongs according to claim 11, characterized in that the opening in a first handle is disposed within the heat shield and, in the longitudinal direction of the rod, is at least twice as long as the opening in a second handle.

13. Grill tongs according to claim 1, characterized in that the heat shield can be optionally fastened on one or the other side of the rod.

14. Grill tongs according to claim 1, characterized in that the handle is thermally insulated from the rod and from the heat shield and is connected to at least one of the rod and the heat shield by at least a screw.

15. Grill tongs according to claim 1, characterized in that the gripping surfaces are an elongated element
   of which a longitudinal axis extends at an angle with respect to a longitudinal axis of the rods and
   having free ends of which point in a same direction with respect to the rods as a closed side of the heat shield.

16. Method for using grill tongs according claim 1, characterized in that
   introducing the four fingers of a user's hand whereby an index finger to a little finger are introduced on an inner side of a heat shield and placed around a handle and
   bringing a thumb of the user's hand into contact with another handle and
   bringing the handles together and closing the, and tongs bringing the two handles apart to open the tongs.

* * * * *